United States Patent
Hong et al.

(10) Patent No.: US 11,530,279 B2
(45) Date of Patent: Dec. 20, 2022

(54) BROAD MOLECULAR WEIGHT DISTRIBUTION POLYMER PRODUCT FROM LOOP REACTORS WITH INTENTIONAL THERMAL GRADIENTS

(71) Applicant: ExxonMobil Chemical Patents Inc., Baytown, TX (US)

(72) Inventors: Yifeng Hong, Houston, TX (US); Jay L. Reimers, Houston, TX (US)

(73) Assignee: EXXONMOBIL CHEMICALS PATENTS INC., Baytown, TX (US)

( * ) Notice: Subject to any disclaimer, the term of this patent is extended or adjusted under 35 U.S.C. 154(b) by 198 days.

(21) Appl. No.: 16/827,091

(22) Filed: Mar. 23, 2020

(65) Prior Publication Data

US 2020/0317824 A1 Oct. 8, 2020

Related U.S. Application Data

(60) Provisional application No. 62/829,750, filed on Apr. 5, 2019.

(51) Int. Cl.
| | | |
|---|---|---|
| *C08F 2/01* | (2006.01) | |
| *C08F 2/04* | (2006.01) | |
| *C08F 210/06* | (2006.01) | |

(52) U.S. Cl.
CPC .......... *C08F 2/01* (2013.01); *C08F 2/04* (2013.01); *C08F 210/06* (2013.01)

(58) Field of Classification Search
USPC ............................................ 422/132; 526/65
See application file for complete search history.

(56) References Cited

U.S. PATENT DOCUMENTS

| | | |
|---|---|---|
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,041,584 A | 8/1991 | Crapo et al. |

(Continued)

FOREIGN PATENT DOCUMENTS

| | | |
|---|---|---|
| EP | 0 500 944 | 9/1992 |
| EP | 0 594 218 | 4/1994 |

(Continued)

OTHER PUBLICATIONS

Touloupides et al., "Modeling and Simulation of an industrial slurry-phase catalytic olefin polymerization reactor series", Chemical Engineering Science, vol. 65, No. 10, May 15, 2010, pp. 3208-3222.

(Continued)

*Primary Examiner* — Fred M Teskin

(57) ABSTRACT

A method for producing a polyolefin with a wide molecular weight distribution can comprise: polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a loop thermal gradient of 50° C. to 150° C. and/or a standard deviation of inter-component thermal gradients along the loop reactor of 10° C. to 50° C.

23 Claims, 3 Drawing Sheets

(56) References Cited

U.S. PATENT DOCUMENTS

| | | |
|---|---|---|
| 5,066,741 A | 11/1991 | Campbell, Jr. |
| 5,091,352 A | 2/1992 | Kioka et al. |
| 5,103,031 A | 4/1992 | Smith, Jr. |
| 5,153,157 A | 10/1992 | Hlatky et al. |
| 5,157,137 A | 10/1992 | Sangokoya |
| 5,189,192 A | 2/1993 | LaPointe et al. |
| 5,198,401 A | 3/1993 | Turner et al. |
| 5,204,419 A | 4/1993 | Tsutsui et al. |
| 5,206,197 A | 4/1993 | Campbell, Jr. |
| 5,206,199 A | 4/1993 | Kioka et al. |
| 5,235,081 A | 8/1993 | Sangokoya |
| 5,241,025 A | 8/1993 | Hlatky et al. |
| 5,248,801 A | 9/1993 | Sangokoya |
| 5,329,032 A | 7/1994 | Tran et al. |
| 5,341,124 A | 8/1994 | Leyden et al. |
| 5,384,299 A | 1/1995 | Turner et al. |
| 5,407,884 A | 4/1995 | Turner et al. |
| 5,434,115 A | 7/1995 | Yamada et al. |
| 5,502,124 A | 3/1996 | Crowther et al. |
| 5,648,438 A * | 7/1997 | Henry .................. C08F 210/16 526/65 |
| 5,721,185 A | 2/1998 | LaPointe et al. |
| 5,939,346 A | 8/1999 | Marks et al. |
| 6,562,914 B1 | 5/2003 | Andtsjo et al. |
| 2006/0173123 A1 | 8/2006 | Yang et al. |
| 2008/0153997 A1 | 6/2008 | Casty et al. |
| 2011/0196116 A1* | 8/2011 | Kiss ...................... B01J 19/006 526/90 |
| 2017/0321047 A1 | 11/2017 | Vantomme et al. |

FOREIGN PATENT DOCUMENTS

| | | |
|---|---|---|
| WO | 97/36942 A | 10/1997 |
| WO | 02/38628 | 5/2002 |
| WO | 03/040095 | 5/2003 |
| WO | 03/040201 | 5/2003 |
| WO | 03/040233 | 5/2003 |
| WO | 03/040442 | 5/2003 |

OTHER PUBLICATIONS

Chen et al., "Cocatalysts for Metal-Catalyzed Olefin Polymerization: Activators, Activation Processes, and Structure-Atcivity Relationships", Chem. Rev. 2000, vol. 100, pp. 1391-1434.

* cited by examiner

BROAD MOLECULAR WEIGHT DISTRIBUTION POLYMER PRODUCT FROM LOOP REACTORS WITH INTENTIONAL THERMAL GRADIENTS

CROSS-REFERENCE TO RELATED APPLICATIONS

This application claims priority to U.S. Ser. No. 62/829,750, filed Apr. 5, 2019, herein incorporated by reference.

BACKGROUND

The present invention relates to controlling the molecular weight distribution of a polymer product from a polymerization reaction.

In the industrial-scale polymerization reactions, solution polymerization and slurry polymerization are two major processes that involve dissolution or suspension of polymers in solvent. In the solution polymerization process, the monomer, catalyst/activator, and polymer are dissolved into the solvent, typically a nonreactive solvent. Heat released by the reaction is absorbed by the solvent and removed by various methods including, but not limited to, chilling the feed solvent, reflux cooling, jacketed cooling, and external heat exchangers. The solvent and unreacted monomers are flashed off from the polymers in the concentration and devolatilization stages after the reaction. The resulting molten polymers are then extruded and pelletized in water to form small pellets, which are dried and bagged sequentially. Slurry polymerization has similar steps with the major differences being that the polymers are suspended in the solvent and the solvent may be reactive.

Continuous stirred-tank reactor (CSTR) and loop reactors are used in both solution and slurry polymerization processes. While CSTR solution or slurry polymerization processes beneficially mix the reactants and catalyst well, the processes struggle to accommodate very high heat of polymerization because of inefficient heat removal from the reactor. That is, reflux cooling, cooling jacket, or chilled feed for polymerization in a CSTR provide limited capability of heat removal, which results in higher reaction temperatures. Currently, metallocene catalysts are widely used in producing polyolefins because of their higher catalyst activity as compared to conventional Ziegler-Natta catalysts. However, metallocene catalysts generally require lower reaction temperatures than the Ziegler catalysts. Therefore, a dilute polymer concentration or reduced conversion is usually needed if a CSTR is used in solution or slurry polymerization processes.

The loop reactor can overcome the limitations of the CSTR in solution and slurry polymerization processes. Generally, loop reactors are several heat exchangers in a loop. The loop reactor can take away massive heat released by the polymerization reactions, which enables high polymer concentration and high monomer conversion. Moreover, with feed chilling, the temperature of reaction can be maintained at considerably lower temperatures than that in CSTR process, meeting the requirement for metallocene catalysts.

Molecular weight distribution has profound influence over the mechanical performance of polymers. In general, high molecular weight increases the strength, toughness, impact resistance, and crack resistance due to a high degree of polymer chain entanglement. However, high molecular weight also increases the viscosity, which makes processing the polymer more difficult. Low molecular weight enables higher molecular mobility and lower viscosity because more end groups increase free volume, resulting in a polymer that is more easily processed. When a polymerization product is designed, it is important to balance both high and low molecular weight portions in polymer, in order to provide a polymer that can be simultaneously reasonably processed and produce an article with good mechanical properties. However, such balanced polymer design is not easy to achieve in solution or slurry polymerization processes because of the limitations of catalysts available, especially the widely applied metallocene catalyst system, which usually produces polymers having a narrow molecular weight distribution.

SUMMARY OF THE INVENTION

The present invention relates to broadening the molecular weight distribution of a polymer product from a polymerization reaction by inducing thermal gradients within a loop reactor.

A first nonlimiting example embodiment is a method comprising: polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a loop thermal gradient of 50° C. to 150° C.

A second nonlimiting example embodiment is a method comprising: polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a standard deviation of inter-component thermal gradients along the loop reactor of 10° C. to 50° C.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to broadening the molecular weight of a polymer product (e.g., polyethylene, polypropylene, etc.) from a polymerization reaction by inducing thermal gradients within in a loop reactor. Such thermal gradients can be for the overall loop reactor or between components within the loop reactor. Although in many cases a narrow molecular weight distribution is desired, sometimes an intentionally broadened distribution polymer can simultaneously provide reasonable processability and produce an article with good mechanical properties. Therefore, the ability to control the molecular weight distribution of a polymer product produced in a loop reactor can be very beneficial.

A polydispersity index (PDI) is used herein to characterize the molecular weight distribution. PDI refers to the weight average molecular weight (Mw) divided by the number average molecular weight (Mn). Unless otherwise noted, all molecular weight units (e.g., Mw, Mn) are g/mol, and PDI is unitless. Molecular weights and PDI are determined by Gel Permeation Chromatography (GPC) as described in U.S. Patent Application Publication No. 2006/0173123, which is incorporated herein by reference.

Loop Reactors with Intentional Thermal Gradients

Figure 1:
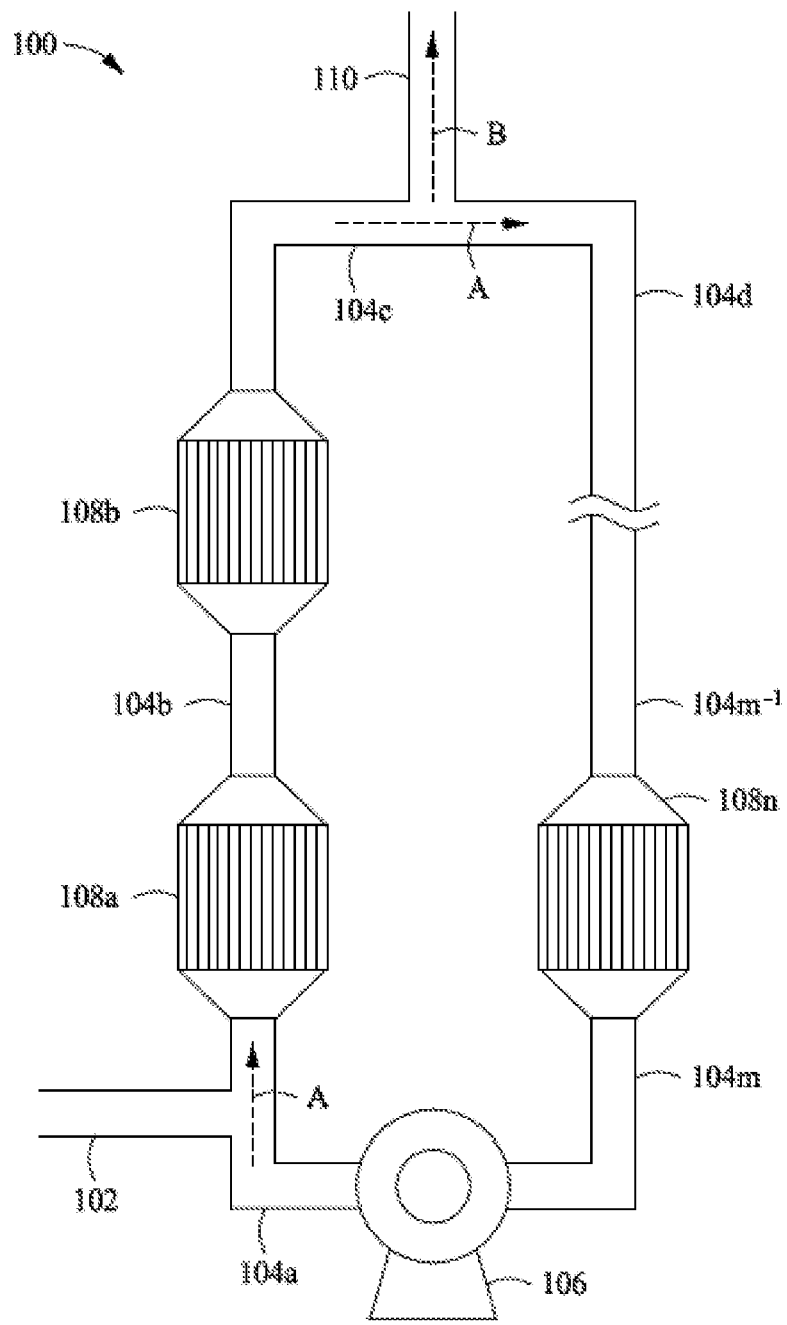
FIG. 1 illustrates a diagram of an example loop reactor.

FIG. 1 illustrates a diagram of a loop reactor 100. Feedstock comprising one or more monomers is introduced to a first section of loop line 104a of the loop reactor 100 via feedstock line 102. A pump 106 moves material (e.g., feedstock and product) through other components of the loop reactor 100. Components of a loop reactor include, but are not limited to, reactors (e.g., heat exchangers), lines that fluidly connect two reactors, adjacent lines where a polymer product outlet defines a connection point between the adjacent lines, compressors, pumps, and the like. In order to produce thermal gradients that cause the polymer product to have a broad molecular weight distribution, the loop reactor 100 should include two or more reactors. In this example, the loop reactor 100 comprises pump 106, m number of sections of loop lines 104a-m, and n number of reactors 108a-n, where m and n can independently be 2 to 50 or more, or 2 to 20, or 2 to 12.

Following the direction of flow A from the feedstock line 102 through the loop of the loop reactor 100, the flow A encounters the following components in order: the first section of loop line 104a, a first reactor 108a, second section of loop line 104b, a second reactor 108b, a third section of loop line 104c, a fourth section of loop line 104d, and so on until a $m^{th}-1$ section of loop line 104m-1, a $n^{th}$ reactor 108n, a $m^{th}$ section of loop line 104m, and pump 106 where the flow A completes the loop back into the first section of loop line 104a. In this illustrated example, there is also a product line 110 that extends from and defines the demarcation between the third section of loop line 104c and the fourth section of loop line 104d. A portion of the material B flowing through the loop reactor 100 can be removed from the loop via the product line 100. The product line 110 and pump 106 can be in other locations along the loop reactor.

Catalyst systems can be injected to the loop reactor 100 with the feedstock or at additional ports (not illustrated) along the loop. As used herein, a "catalyst system" is the combination of at least one catalyst compound, at least one activator, and an optional co-activator. The choice of catalyst system(s) depends on the temperature of the reactors 108a-108n, the chemical composition the monomer(s), the concentration of monomer(s), and the like.

Unless otherwise specified, the temperature of a component of the loop reactor is the temperature of the material in the component at the outlet of the component.

As used herein, the term "inter-component thermal gradient" is the temperature difference between two adjacent components of a loop reactor. As used herein, the term "loop thermal gradient" or "loop ΔT" is the difference between the maximum temperature in the loop reactor and the minimum temperature in the loop reactor. Typically, this is at or near the feedstock entrance. That is, the temperature of the feedstock is low and as the material proceeds around the loop, the temperature increases and is at its max near the feedstock inlet. The cooled feedstock reduces the material to its lowest temperature and the cycle continues. However, chillers or other components could be included to reduce the temperature before the feedstock inlet. Therefore, the loop thermal gradient is referred to an overall maximum temperature minus an overall minimum temperature.

The present invention uses reactors operated at different temperatures to create reaction zones that favor the production of different molecular weight polymers, which broadens the molecular weight distribution of the polymer product from the loop reactor. The max ΔT in the methods and systems of the present invention can be 20° C. to 150° C., 50° C. to 150° C., or 50° C. to 75° C., or 75° C. to 125° C., or 100° C. to 150° C. Without being limited by theory, it is believed that a higher max ΔT results in a polymer product with a broader molecular weight distribution (i.e., higher PDI).

Another way to characterize the methods and systems of the present invention is by the standard deviation of the inter-component thermal gradients along the loop reactor. The standard deviation of the inter-component thermal gradients along the loop reactor in the methods and systems of the present invention can be 10° C. to 50° C., or 10° C. to 30° C., or 20° C. to 40° C., or 25° C. to 50° C. Without being limited by theory, it is believed that a higher standard deviation of the inter-component thermal gradients along the loop reactor results in a polymer product with a broader molecular weight distribution (i.e., higher PDI).

By using intentional thermal gradients in the loop reactor (overall and/or inter-component thermal gradients), the polymer product can have a molecular weight distribution with a PDI of 2.2 to 8, 2.5 to 8, or 3 to 6.

Polymerization Process

The methods of the present disclosure can include forming a polyolefin product by polymerizing one or more monomers in the presence of a catalyst system in a loop reactor.

The polymerization processes described herein may be carried out in any manner known in the art. Any solution, suspension, slurry, or gas phase polymerization process known in the art can be used. Such processes can be run in a batch, semi-batch, or continuous mode. Preferably, the polymerization process is continuous.

For example, the polymerization process may be a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent). A slurry polymerization process generally operates between about 1 atmosphere (atm) to about 50 atm pressure (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. Examples of diluents include, but are not limited to, one methane, ethane, propane, butane, isobutane, isopentane, hexanes, heptanes, and any combination thereof. When a propane medium is used the process must be operated above the reaction diluent critical temperature and pressure. Preferably, a hexane or an isobutane medium is employed.

Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (ISOPAR™); perhalogenated hydrocarbons, such as perfluorinated C4-10 alkanes, chlorobenzene, and aromatic and alkylsubstituted aromatic compounds, such as benzene, toluene, mesitylene, and xylene. Suitable solvents also include liquid olefins that may be polymerized including ethylene, propylene, 1-butene, 1-hexene, 1-pentene, 3-methyl-1-pentene, 4-methyl-1-pentene, 1-octene, 1-decene, and mixtures thereof. In a preferred example, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another example, the solvent is not aromatic; preferably aromatics are present in the solvent at less than 1 wt %, preferably less than 0.5 wt %, preferably 0 wt % based upon the weight of the solvents.

In a preferred example, the feedstock concentration of monomers for the polymerization is 60 vol % solvent or less, preferably 40 vol % or less, or preferably 20 vol % or less, based on the total volume of the feedstream.

In another example where the polymerization process is a solution polymerization, the process may comprise polymerizing one or more monomers dissolved in a solvent as described herein in the presence of a catalyst system under conditions to obtain a first effluent comprising a solution of polyolefin and solvent and/or unreacted monomer.

The polymerization processes may be conducted under conditions including a temperature of about 50° C. to about 220° C., preferably about 70° C. to about 210° C., preferably about 90° C. to about 200° C., preferably from 100° C. to 190° C., preferably from 130° C. to 160° C. The polymerization process may be conducted at a pressure of from about 120 psi to about 1800 psi (about 12,411 kPa), preferably from 200 psi to 1000 psi (about 1379 kPa to 6895 kPa), preferably from 300 psi to 600 psi (about 2068 kPa to 4137 kPa). Preferably, the pressure is about 450 psi (about 3103 kPa).

The feedstock can be introduced at a temperature below reaction temperatures to reduce the concentration of the material in the loop reactor. The feedstock can be introduced, for example, at −10° C. to 40° C., preferably from −10° C. to 25° C., or preferably from −10° C. to 5° C.

Hydrogen may be present during the polymerization process at a partial pressure of 0.001 psig to 50 psig (0.007 kPa to 345 kPa), preferably from 0.01 psig to 25 psig (0.07 kPa to 172 kPa), more preferably 0.1 psig to 10 psig (0.7 kPa to 70 kPa).

Catalyst Systems

Catalyst systems suitable for use in conjunction with the methods and systems of the present invention can preferably comprise metallocene catalysts and other single site catalysts because these catalysts generally produce polymers with narrow molecular weight distribution. The PDI values for polymers made with metallocene catalyst systems in homogeneous polymerization media are typically close to the statistically expected value of 2.0. However, any polymerization catalyst capable of polymerizing the monomers disclosed can be used if the catalyst is sufficiently active under the polymerization conditions disclosed herein. Thus, Group 3-10 transition metals can form suitable polymerization catalysts. A suitable olefin polymerization catalyst will be able to coordinate to, or otherwise associate with, an alkenyl unsaturation. Examples of olefin polymerization catalysts can include, but are not limited to, Ziegler-Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, New York, 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these non-metallocene metal-centered, heteroaryl ligand catalyst compounds are typically made fresh by mixing a catalyst precursor compound with one or more activators. Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. Patent Application Publication No. 2008/0153997, each of which is herein incorporated by reference.

Activators and associated activation methods can be used in the catalyst system. Examples of activators include, but are not limited to, aluminoxane and aluminum alkyl activators, ionizing activators, and nonionizing activators.

Examples of aluminoxane and aluminum alkyl activators and associated methods can be found in U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, and 5,103,031; European Patent and Application Publication Nos. EP 0 561 476 A1, EP 0 279 586 B1, EP 0 516 476 A, and EP 0 594 218 A1; and PCT Patent Publications No. WO 94/10180, which are each incorporated herein by reference.

Examples of ionizing activators and associated methods can be found in European Patent and Application Publication Nos. EP 0570982 A, EP 0520732 A, EP 0495375 A, EP 0500944 B 1, EP 0277003 A and EP 0277004 A; and U.S. Pat. Nos. 5,153,157, 5,198,401, 5,066,741, 5,206,197, 5,241,025, 5,384,299, and 5,502,124.

Examples of nonionizing activators and associated methods can be found in E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Monomers

Any monomer having one or more (non-conjugated) aliphatic double bond(s) and two or more carbon atoms may be used. Examples of monomers include, but are not limited to, α-olefins (e.g., ethylene, propylene, butene-1, hexene-1, octene-1, decene-1, and dodecene-1), substituted olefins (e.g., styrene, paramethylstyrene, and vinylcyclohexane), non-conjugated dienes (e.g., vinylcyclohexene), α,ω-dienes (e.g., 1,5-hexadiene and 1,7-octadiene), cycloolefins (e.g., cyclopentene, cyclohexene, and cyclohexadiene), norbornene, and the like, and any combination thereof.

Olefin monomer or monomers can be used. Advantageous monomers include $C_2$ to $C_{100}$ olefins, advantageously $C_2$ to $C_{60}$ olefins, advantageously $C_3$ to $C_{40}$ olefins advantageously $C_3$ to $C_{20}$ olefins, advantageously $C_3$ to $C_{12}$ olefins. Monomers include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, advantageously $C_3$ to $C_{12}$ alpha-olefins. Advantageous olefin monomers can be one or more of ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

Aromatic-group-containing monomers containing up to 30 carbon atoms can be used. Suitable aromatic-group-containing monomers comprise at least one aromatic structure, advantageously from one to three, more advantageously a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to $C_1$ to $C_{10}$ alkyl groups. Additionally, two adjacent substitutions can be joined to form a ring structure. Advantageous aromatic-group-containing monomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethylstyrene, 4-phenyl-butene-1 and allylbenzene.

Non-aromatic cyclic group containing monomers can be used. These monomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantad the like.

Diolefin monomer(s) can be used. Advantageous diolefin monomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene monomers (e.g., divinyl monomers). More advantageously, the diolefin monomers are linear divinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

EXAMPLE EMBODIMENTS

A first nonlimiting example embodiment is a method comprising: polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a loop thermal gradient of 50° C. to 150° C.

A second nonlimiting example embodiment is a method comprising: polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a standard deviation of inter-component thermal gradients along the loop reactor of 10° C. to 50° C.

The foregoing embodiments can further include one or more of the following: Element 1: wherein the one or more monomers comprises a first monomer selected from the group consisting of: ethylene, propylene, butene, pentene, hexene, heptene, octene, nonene, decene, dodecene, 4-methylpentene-1,3-methylpentene-1,3,5,5-trimethylhexene-1, and 5-ethylnonene-1; Element 2: Element 1 and wherein the one or more monomers further comprises a second monomer different than the first monomer and selected from the group consisting of: ethylene, propylene, butene, pentene, hexene, heptene, octene, nonene, decene, dodecene, 4-methylpentene-1,3-methylpentene-1,3,5,5-trimethylhexene-1,5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene; Element 3: wherein the loop reactor comprises two to twenty reactors in series; Element 4: the method further comprising: introducing a feedstock comprising the one or more monomers at −10° C. to 40° C.; Element 5: wherein the polydispersity index of the polyolefin product is 3 to 8; Element 6: wherein the loop reactor has a standard deviation of inter-component thermal gradients along the loop reactor of 10° C. to 50° C.; Element 7: wherein the polymerizing is a slurry polymerization process performed at 15 psi to 735 psi and 0° C. to about 120° C.; and Element 8: wherein the polymerizing is a solution polymerization process performed at 120 psi to 1800 psi and 50° C. to 220° C. Examples of combinations include, but are not limited to, Element 7 or Element 8 in combination with one or more of Elements 1-6; and two or more of Elements 1-6 in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

Figure 2:
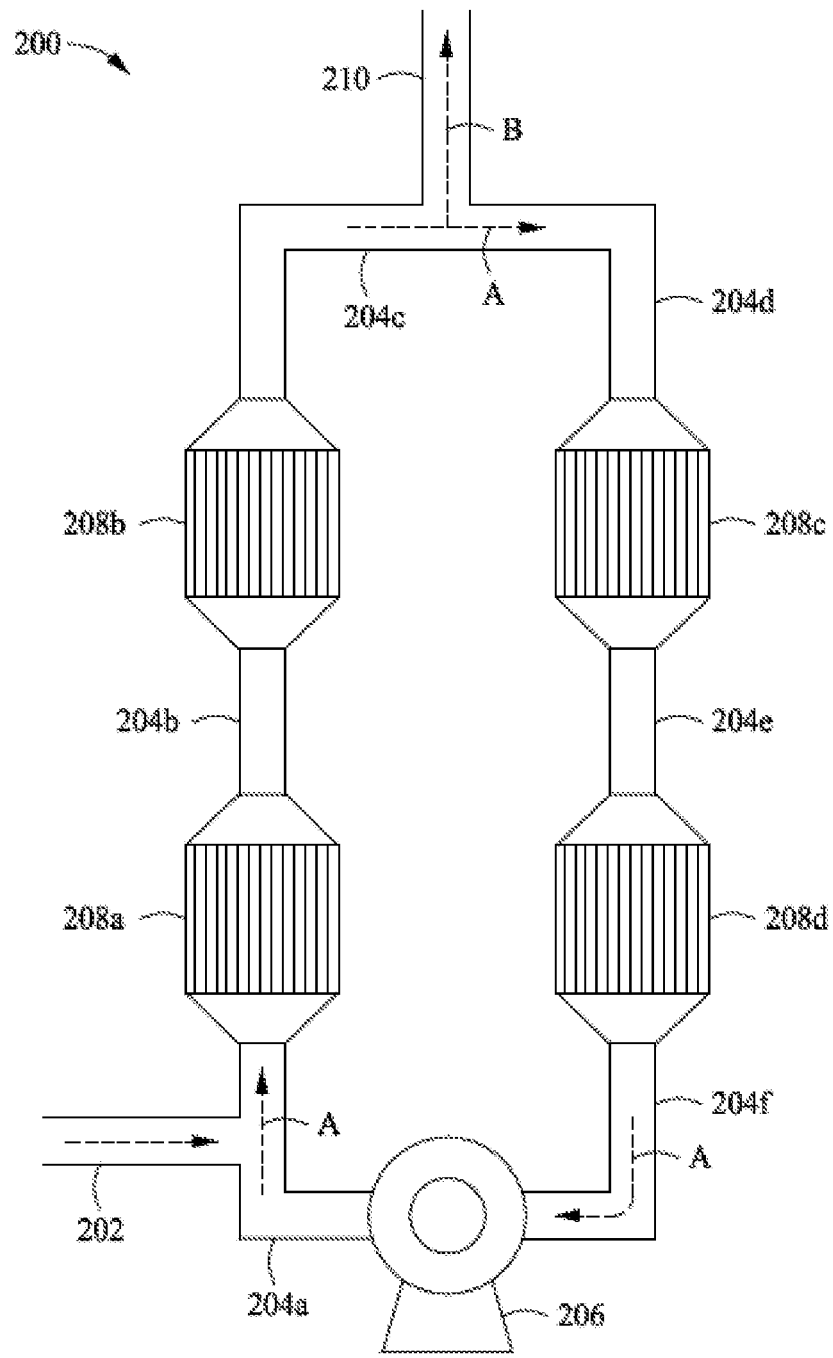
FIG. 2 illustrates a diagram of an example loop reactor in which different thermal gradients were simulated.

A polymerization reaction was simulated for a loop reactor according to FIG. 2 with different thermal gradients (overall and inter-component thermal gradients).

The loop reactor 200 of FIG. 2 includes a feedstock line 202 that supplies feedstock to a first section of loop line 204a. Once in the loop reactor 200 and following the direction of flow A from the feedstock line 202 through the loop of the loop reactor 200, the flow A encounters the following components in order: the first section of loop line 204a, a first reactor 208a, second section of loop line 204b, a second reactor 208b, a third section of loop line 204c, a fourth section of loop line 204d where a product line 210 extends from and defines the demarcation between the third section of loop line 204c and the fourth section of loop line 204d, a third reactor 208c, a fifth section of loop line 204e, a fourth reactor 208d, a sixth section of loop line 204f, a pump 206, and completes the loop at the first section of loop line 204a.

The simulation software used was Aspen Plus version 8.8 with the Aspen Polymer Module. The thermodynamic method is based on Perturbed-Chain Statistical Association Fluid Theory (PC-SAFT). The required material properties were directly obtained from the property data banks implemented in Aspen Plus. Plug flow reactors were used to simulate the heat exchangers and loop lines in the loop reactor. The heat exchangers were set to be in isothermal mode while the loop lines were treated adiabatically.

The reaction simulated in the example was copolymerization of ethylene and propylene. Copolymerization kinetics were obtained from the literature and implemented in the simulator. Therefore, both heat and mass balance and polymer properties, including chemical composition and molecular weight distribution can be accurately modeled. Metallocene catalyst was used in the catalyst system. The weight fraction ratio of ethylene monomer:propylene monomer:solvent was set to be 4.4%:34.7%:60.9%. The feedstock temperature was 5° C., and the recycle ratio in the loop was 5. In a loop reactor, the recycle ratio is defined as the ratio between the mass flow rate of the reactor effluent recycled A back to a reactor via a loop line 204 to the mass flow rate of the reactor effluent extracted B as polyolefin product from the loop reactor 200 via the product line 210.

Three cases were modeled in this example. The lines 204 are not controlled for temperature, so if the adiabatic reaction continues, the temperature in the lines 204 may increase. Table 1 includes the temperature of the components, which as described above is the temperature at the component outlet, and the resultant max $\Delta T$ of the loop reactor, standard deviation of the inter-component thermal gradients of the loop reactor, and PDI of the polymer product.

TABLE 1

| Component | Case 1 | Case 2 | Case 3 |
|---|---|---|---|
| first section of loop line 204a | 75.2 | 106.5 | 131.0 |
| first reactor 208a | 85.0 | 55.0 | 55.0 |
| second section of loop line 204b | 86.6 | 55.3 | 55.1 |
| second reactor 208b | 85.0 | 55.0 | 85.0 |
| third section of loop line 204c | 86.5 | 55.3 | 85.6 |
| fourth section of loop line 204d | 89.9 | 56.0 | 86.8 |
| third reactor 208c | 85.0 | 85.0 | 85.0 |
| fifth section of loop line 204e | 86.6 | 86.5 | 116.9 |
| fourth reactor 208d | 85.0 | 115.0 | 145.0 |
| sixth section of loop line 204f | 86.4 | 118.7 | 147.9 |
| loop $\Delta T$ (° C.) | 9.8 | 51.5 | 76.0 |
| standard deviation of the inter-component thermal gradients (° C.) | 3.6 | 25.6 | 32.3 |
| PDI | 2.02 | 2.45 | 2.99 |

Figure 3:
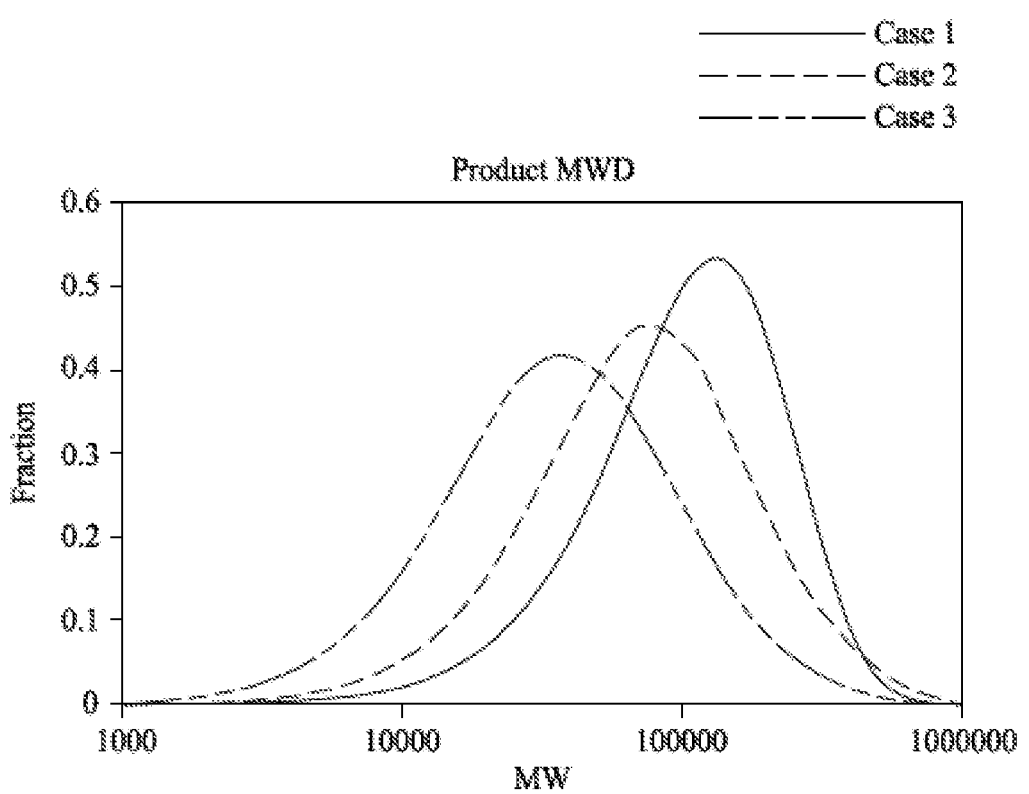
FIG. 3 illustrates simulated molecular weight distribution for polymers produced according to simulated polymerization processes including different thermal gradients.

Case 1 is a control where thermal gradients are not intentionally created in the loop reactor. Cases 2 and 3 have intentional thermal gradients where Case 3 has greater intentional thermal gradients than Case 2. As thermal gradients are intentionally included in and increased in degree (e.g., greater max $\Delta T$ and greater standard deviation of the inter-component thermal gradients) the loop reactor the PDI increases, which indicates that the polyolefin product has a broader molecular weight distribution. FIG. 3 is the simulated molecular weight distribution for the three cases, where Case 3 with the largest thermal gradients has the broadest molecular weight distribution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of"

the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a loop thermal gradient of 50° C. to 150° C.

2. The method of claim 1, wherein the one or more monomers comprises a first monomer selected from the group consisting of: ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

3. The method of claim 2, wherein the one or more monomers further comprises a second monomer different than the first monomer and selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methyl styrene, para-alkyl styrenes, vinyltoluenes, vinylnaphthalene, allyl benzene, and indene.

4. The method of claim 1, wherein the loop reactor comprises two to twenty reactors in series.

5. The method of claim 1, further comprising:
introducing a feedstock comprising the one or more monomers at −10° C. to 40° C.

6. The method of claim 1, wherein the polydispersity index of the polyolefin product is 3 to 8.

7. A method comprising: polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a loop thermal gradient of 50° C. to 150° C., and wherein the loop reactor has a standard deviation of inter-component thermal gradients along the loop reactor of 10° C. to 50° C.

8. The method of claim 1, wherein the polymerizing is a slurry polymerization process performed at 15 psi to 735 psi and 0° C. to about 120° C.

9. The method of claim 1, wherein the polymerizing is a solution polymerization process performed at 120 psi to 1800 psi and 50° C. to 220° C.

10. A method comprising:
polymerizing one or more monomers in the presence of a catalyst system in a loop reactor to produce a polyolefin product having a polydispersity index of 2.5 to 8, wherein the loop reactor comprises two or more reactors in series, and wherein the loop reactor has a standard deviation of inter-component thermal gradients along the loop reactor of 10° C. to 50° C.

11. The method of claim 10, wherein the one or more monomers comprises a first monomer selected from the group consisting of: ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

12. The method of claim 11, wherein the one or more monomers further comprises a second monomer different than the first monomer and selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methyl styrene, para-alkyl styrenes, vinyltoluenes, vinylnaphthalene, allyl benzene, and indene.

13. The method of claim 10, wherein the loop reactor comprises two to twenty reactors in series.

14. The method of claim 10, further comprising:
introducing a feedstock comprising the one or more monomers at −10° C. to 40° C.

15. The method of claim 10, wherein the polydispersity index of the polyolefin product is 3 to 8.

16. The method of claim 10, wherein the polymerizing is a slurry polymerization process performed at 15 psi to 735 psi and 0° C. to about 120° C.

17. The method of claim 10, wherein the polymerizing is a solution polymerization process performed at 120 psi to 1800 psi and 50° C. to 220° C.

18. The method of claim 7, wherein the one or more monomers comprises a first monomer selected from the group consisting of: ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

19. The method of claim 18, wherein the one or more monomers further comprises a second monomer different than the first monomer and selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methyl styrene, para-alkyl styrenes, vinyltoluenes, vinylnaphthalene, allyl benzene, and indene.

20. The method of claim 18, wherein the one or more monomers further comprises styrene, paramethylstyrene, 4-phenyl-butene-1, allylbenzene, vinylcyclohexane, vinyl cyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

21. The method of claim 18, further comprising:
introducing a feedstock comprising the one or more monomers at −10° C. to 40° C.

22. The method of claim 7, wherein the polydispersity index of the polyolefin product is 3 to 8.

23. The method of claim 2, wherein the one or more monomers further comprises styrene, paramethylstyrene, 4-phenyl-butene-1, allylbenzene, vinylcyclohexane, vinyl cyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

\* \* \* \* \*